United States Patent [19]

Abe et al.

[11] Patent Number: 5,318,757
[45] Date of Patent: Jun. 7, 1994

[54] HONEYCOMB HEATER AND CATALYTIC CONVERTER

[75] Inventors: Fumio Abe, Handa, Japan; Junichi Susuki, Kuwana, both of Japan

[73] Assignee: NGK Insulators, Ltd., Japan

[21] Appl. No.: 22,401

[22] Filed: Feb. 24, 1993

Related U.S. Application Data

[63] Continuation of Ser. No. 674,918, Mar. 26, 1991, abandoned.

[30] Foreign Application Priority Data

Dec. 21, 1990 [JP] Japan .................. 2-413096

[51] Int. Cl.⁵ .................................. F01N 3/10
[52] U.S. Cl. .................... 422/174; 422/173; 422/177; 502/349; 60/299; 60/300
[58] Field of Search ............ 422/173, 174, 175, 177; 423/213.5; 502/349; 60/299, 300

[56] References Cited

U.S. PATENT DOCUMENTS

| | | | |
|---|---|---|---|
| 3,956,614 | 5/1976 | Hervert | 219/541 |
| 4,675,308 | 6/1987 | Wan et al. | 502/304 |
| 4,976,929 | 12/1990 | Cornelison et al. | 422/174 |
| 5,039,647 | 8/1991 | Ihara et al. | 423/213.5 X |
| 5,063,029 | 11/1991 | Mizuno et al. | 422/177 X |

FOREIGN PATENT DOCUMENTS

| | | |
|---|---|---|
| 0125565 | 11/1984 | European Pat. Off. . |
| 0194507 | 2/1986 | European Pat. Off. . |
| 0262962 | 4/1988 | European Pat. Off. ......... 423/213.5 |
| 0272136 | 6/1988 | European Pat. Off. ......... 423/213.5 |
| 0355489 | 2/1990 | European Pat. Off. . |
| 1188373 | 3/1965 | Fed. Rep. of Germany . |
| 2333092 | 1/1975 | Fed. Rep. of Germany ........ 60/300 |
| 3077544 | 4/1988 | Japan ............................... 423/213.5 |
| 63-67609 | 5/1988 | Japan . |
| 61-161599 | 5/1988 | Japan . |
| 63-156545 | 6/1988 | Japan . |
| 63-185451 | 8/1988 | Japan . |
| 3197546 | 8/1988 | Japan ............................... 423/213.5 |
| 2049377A | 12/1980 | United Kingdom . |
| WO89/10471 | 11/1989 | World Int. Prop. O. . |

Primary Examiner—Robert J. Warden
Assistant Examiner—Hien Tran
Attorney, Agent, or Firm—Parkhurst, Wendel & Rossi

[57] ABSTRACT

A honeycomb heater has a honeycomb structure having a number of passages defined by partition walls, at least two electrodes in electrical contact with the honeycomb structure, a catalyst composition formed on partition walls of the honeycomb structure, including zirconia powder loaded with Rh, an inorganic heat-resistant oxide and a rare earth element oxide. A catalytic converter has at least one or two main monolithic catalyst(s) and a honeycomb heater disposed upstream, downstream or between the main monolithic catalysts.

10 Claims, 1 Drawing Sheet

HONEYCOMB HEATER AND CATALYTIC CONVERTER

This is a continuation of application Ser. No. 07/674,918 filed Mar. 26, 1991, now abandoned.

BACKGROUND OF THE INVENTION

1. Field of the Invention

The present invention relates to a honeycomb heater and a catalytic converter wherein a honeycomb structure is coated with a specific catalyst composition.

2. Description of the Related Art

Honeycomb heaters of the above-described type can be employed as heaters for domestic use, such as hot air heaters, or as industrial heaters, such as preheaters used for control of automobile exhaust emission. The abovedescribed catalytic converters can be used in automobile exhaust emission control.

Catalytic converters for use in automobile exhaust gas control must have a predetermined temperature or above when operated so as to cause its catalyst to undergo catalytic action. Hence, the catalyst must be heated when the temperature thereof is not sufficiently high, i.e., at the beginning of running of a vehicle.

Such techniques for heating the catalyst have been proposed in, for example, Japanese Utility Model Laid-Open No. 67609/1988. This disclosed technique is a catalytic converter comprised of a metal monolithic catalyst disposed upstream of and adjacent to a main ceramic monolithic catalyst. The metal monolithic catalyst comprises an electrically conductive metal substrate with alumina coated thereon.

Furthermore, in Japanese Patent Laid-Open Nos. 156545/1988 and 185451/1988, catalysts for purifying exhaust gas of harmful components such as hydrocarbon (HC), carbon monoxide (CO) and nitrogen oxides ($NO_x$) have been proposed.

In Japanese Patent Laid-Open No. 156545/1988, for the purpose of obtaining a three-way catalyst for automotive exhaust gas having high initial activity and durability, it is disclosed that a honeycomb substrate having unitary (monolithic) structure is coated with a catalyst composition which comprises zirconia loaded with a platinum-group metal, a refractory inorganic oxide such as activated alumina, and a rare earth element oxide such as a cerium oxide.

In Japanese Patent Laid-Open No. 185451/1988, for the same purpose as aforesaid Japanese Patent Laid-Open No. 156545/1988, a purification catalyst for exhaust gas which comprises a honeycomb substrate with a catalyst composition coated thereon is disclosed, the catalyst composition containing a refractory inorganic oxide in a form of particles such as alumina and zirconia whose average particle diameter ranges 0.5–20 μm; and supporting 5–30% platinum by weight and 1–20% rhodium by weight.

Also, in Japanese Patent Laid-Open Nos. 156545/1988 and 185451/1988, it is described that a metal monolith substrate such as an alloy of Fe-Cr-Al is employed as a honeycomb substrate.

Japanese Utility Model Laid-Open No. 67609/1988, however, does not disclose any adequate catalyst composition specifically. However, it is important that a metal monolithic catalyst which is electrically conductive disposed upstream of the main monolithic catalyst have adequate light-off performance at low temperatures thermal resistance and durability against poisonous substances, such as Pb and P.

Both the catalysts for purifying exhaust gas disclosed in Japanese Patent Laid-Open Nos. 156545/1988 and 185451/1988 were not developed for use with a heater; therefore, when they are coated on a heaters, durability and the like of the heater and the coating needs to be developed, due to high operating temperatures thereof.

SUMMARY OF THE INVENTION

An object of the present invention is to provide a honeycomb heater and a catalytic converter which eliminate the aforementioned problems associated with the prior techniques.

To this end, the present invention provides a honeycomb heater comprising , a honeycomb structure having a large number of passages, at least two electrodes for energizing the honeycomb structure, provided on the honeycomb structure, a catalyst composition carried on the honeycomb structure, which contains zirconia powder loaded with at least Rh beforehand, an inorganic heat-resistant oxide and a rare earth element oxide.

It is preferable that the catalyst composition contains zirconia powder loaded with at least Rh beforehand and oxide powder comprising a mixture of a heat-resistant inorganic oxide and a rare earth element oxide loaded with at least one kind of platinum group element(s) beforehand.

The present invention further provides a catalytic converter wherein the above-mentioned honeycomb heater is disposed upstream or downstream of a main monolithic catalyst, or between main monolithic catalysts.

According to the present invention, a honeycomb heater having a resistance adjusting means such as a slit or slits between the electrodes is able to raise the temperature of exhaust gas quickly when the temperature of exhaust gas is low, that is, at the beginning of the running of a vehicle; and therefore is preferred.

It is preferable that the composition of the honeycomb structure in the present invention consists essentially of 2–30% Al by weight, 10–40% Cr by weight, and Fe accounting for most of the remainder.

Preferably, a honeycomb structure employed in the present invention is produced by forming metal powders into a honeycomb configuration and then by sintering a formed honeycomb body.

DETAILED DESCRIPTION OF THE INVENTION

Figure 1:
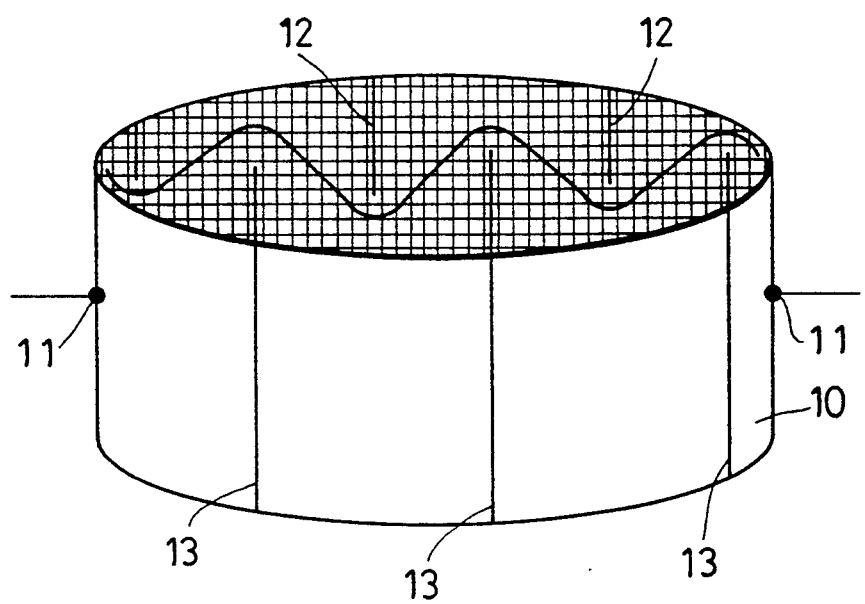
FIG. 1 is a perspective view showing an embodiment of a honeycomb heater.

It is necessary that the honeycomb heater disposed upstream or the like f the main monolithic catalyst have the following important properties:

The catalyst on the honeycomb heater needs to have excellent in 1) light-off performance at low temperature; 2) three-way catalytic performance at high temperature; 3) heat resistance; and 4) durability against poisonous substances. A method is necessary to solve the problem that the heat resistance of Rh-$\gamma Al_2O_3$ (ordinarily used) in a catalyst declines owing to strong interaction between Rh and $\gamma Al_2O_3$, especially in an oxidizing atmosphere. It is also important to prevent the decline of durability against poisonous substances caused by adhesion of Pb and P in exhaust gas on the upstream side.

The substrate of the honeycomb heater needs to have excellent in 1) quick heating; 2) heat resistance; 3) oxidation resistance; 4) corrosion resistance during catalyst preparation; and 5) strength and thermal shock resistance (especially, having no telescope phenomenon).

According to the present invention, a catalyst having excellent properties as noted above contains zirconia powder loaded with at least Rh beforehand, a heat-resistant inorganic oxide and a rare earth element oxide.

The zirconia powder (Rh-$ZrO_2$) loaded with Rh has the advantage of increasing the heat resistance because of the adequate interaction between Rh and $ZrO_2$, $ZrO_2$ powder having a specific surface area of 5 $m^2/g$-100 $M^2/g$ is suitable. Also, employing $ZrO_2$ stabilized by addition of 1-8 mol Of $Y_2O_3$ is preferable from the viewpoint of heat resistance.

The proportion of Rh to $ZrO_2$ is preferably 0.01-15% by weight to obtain adequate light-off performance, steady state performance, durability, etc. A more preferably proportion is 0.01-1% weight, 0.03-0.5% by weight being the most preferable, in order to use the expensive Rh at the least necessary amount and to maintain the durability at a high level.

The preferable percentage of the zirconia powder with Rh contained in the catalyst composition is 5-50% by weight from the viewpoint of dispersion of Rh. Also, from the viewpoint of durability and production cost, 10-30% by weight is preferable, since the $ZrO_2$ material is expensive.

The heat-resistant inorganic oxide can be selected from alumina ($Al_2O_3$), silica ($SiO_2$), titania ($TiO_2$), zirconia ($ZrO_2$) and their compound oxide. To achieve sufficient light-off performance, steady state performance and durability, the heat-resistant inorganic oxide preferably contains at least alumina. More preferably, the inorganic oxide contains more than 70% alumina by weight. Alumina can be used of any type among $\gamma$, $\delta$, $\theta$, $\alpha$, $\chi$, $\kappa$, $\eta$. To assure light-off performance at low temperature alumina having a specific surface area of 100 $m^2/g$ or more (mostly y type) is preferably employed. Also, to assure the durability, it is preferable that a small amount of alumina having a specific surface area of 20 $m^2/g$ or less (mostly $\alpha$ type) is blended with above-mentioned alumina.

As a rare earth element oxide, Y or lanthanoide type elements are employed. $CeO_2$, $La_2O_3$ and their compound oxides show a high purification efficiency for an exhaust gas generated even under various air-to-fuel ratios, because they are able to display their oxygen-storage ability.

The amount of the additional rare earth element oxide is preferably 2-35% by weight of the heat-resistant inorganic oxide such as alumina. Thus heat resistance of the heat-resistant inorganic oxide can be increased further.

It is preferable to improve the catalytic performance that the composition (the mixture) of a heat-resistant inorganic oxide and a rare earth element oxide is made to contain at least one kind of platinum group element selected from Pt, Pd, Rh, Ru, Ir and Os, by a known method. The catalytic composition loaded with said platinum group element(s) beforehand is employed is most preferable because durability will be increased and because the step of impregnating with the platinum group element (noble metal) during preparing a catalyst can be omitted; and therefore, the metallic honeycomb heater can be prevented from corroding.

The noble metal with which the composition of a heat-resistant inorganic oxide and a rare earth element oxide is loaded preferably contains 0.1-10% Pt and/or Pd by weight, because they will not easily interact with Rh on $ZrO_2$; and therefore, durability will be improved.

In the present invention, the total amount of the noble metal(s) loaded on the honeycomb heater with catalyst is preferably 0.5-1.6 per/volume unit (1) of the honeycomb heater, and the total amount of Rh is preferably 0.02-0.3 g/l. Also, the weight ratio of Rh to other platinum group element(s) is preferably 1/19-1/5, from the viewpoint of the catalytic purification activity, durability and production cost.

The preferable ratio of the catalyst composition supported on the honeycomb heater is 35-230 g/l.

In the above-mentioned catalyst composition, the $ZrO2$ powder with Rh and the mixture of the heat-resistant inorganic oxide and the rare earth element oxide may take either a form of mixture, or a form of respective layers.

The mixture of the heat-resistant inorganic oxide and the rare earth element oxide includes the composite oxide thereof.

The preparation of the catalyst composition carried on the honeycomb heater is described hereinafter.

An aqueous solution of rhodium salt such as rhodium nitrate and rhodium chloride which contains required amount of Rh is loaded on $ZrO_2$ powder, followed by calcining at 400°-800° C. If the calcining temperature is under 400° C., the salt would not decomposed sufficiently. If the temperature is over 800° C., undesirable Rh dispersion might occur.

To the obtained $ZrO_2$ Powder containing Rh are added a heat-resistant oxide such as $\gamma$-$Al_2O_3$; and if necessary, an inorganic binder like boehmite alumina is added. Thereto is added a cerium compound like $CeO_2$ powder, and put a deflocculant such as acetic acid to prepare slurry for loading. The slurry is adhered onto the honeycomb heater, followed by drying and firing. The firing temperature is 400°-800° C. Subsequently, the obtained heater is loaded with platinum group element(s) by impregnation, followed by firing at 400°-800° C. after drying. In this case, the metallic honeycomb is liable to corrode during impregnation with the platinum group element(s). Moreover, alloying Rh is promoted while driving and durability is decreased, because the powder of Rh-$ZrO_2$ is loaded by impregnation with other platinum group element(s) such as Pt and Rd.

A preferable method is that the heat-resistant inorganic oxide is loaded by impregnation with the platinum group element(s) beforehand, using an aqueous solution of the platinum group salt.

More preferable method for durability is that after mixing the heat-resistant inorganic oxide and the rare earth element oxide, for example, by wet method and subsequent calcining, the resultant composite oxide is impregnated with Pt and/or Pd.

The above-mentioned method is an example of coating the honeycomb heater in a mixture state with the $ZrO2$ powder containing Rh, the mixture powder of the heat-resistant inorganic oxide and the rare earth element oxide with platinum group element(s). Each powder can be also coated on the honeycomb heater in a layered form having a desired film thickness.

Next, description on the honeycomb heater is as follows.

It is important to coat the honeycomb heater with the above-mentioned catalyst composition. The range of both composition and structure of the honeycomb heater itself is also very important.

As a honeycomb structure, the substrate of the honeycomb heater, a metallic sintered structure produced by forming a powder material into a honeycomb configuration and sintering the formed body is preferred. In this case, so-called powder metallurgy and extrusion are preferably employed, because of their simple process and low cost; moreover, since the structure has a unitary (monolithic) body, no telescope phenomenon occurs, and uniform heating can be achieved.

The honeycomb structure may have a heat-resistant metal oxide, such as $Al_2O_3$ or $Cr_2O_3$, coated on the surface of the cell walls and that of the pores thereof to enhance resistance to heat, oxidation and corrosion.

Whereas any material, ceramic or metal, capable of generating heat when energized, can be used as the material of the honeycomb structure employed in the present invention, the use of metal enhances the mechanical strength and is thus preferred. Examples of such metals include stainless steel and materials having a composition of Fe-Cr-Al, Fe-Cr, Fe-Al, Fe-Ni, W-Co, Ni-Cr or the like. Among the above materials, a composition being composed of 2–30% Al, 10–40% Cr, and Fe the balance being substantially is preferred because of low cost and high resistance to heat, oxidation, corrosion and high strength.

To above-mentioned composition, B, Si, Cu, on Sn can be added as a sintering promoter. Also, a rare earth element can be added up to 5% by weight to improve the resistance to oxidation.

The honeycomb structure employed in the present invention may be porous or non-porous. In the case where a catalyst is carried on the honeycomb structure, a porous honeycomb structure is preferred because a catalyst layer can be closely adhered to such a honeycomb structure, and hardly peels from the honeycomb structure even when a difference in the thermal expansion between the honeycomb structure and the catalyst composition exists.

The metal honeycomb structure, the basic body of the honeycomb heater, will be prepared in the manner described below.

First, Fe powder, Al powder and Cr powder, or alternatively powders of alloys of these metals, are mixed to prepare a metal powder mixture having a desired composition. Subsequently, the metal powder mixture is blended into an organic binder, such as methyl cellulose or polyvinylalcohol, and water to produce a readily formable mixture. That mixture is then formed into a shape of a desired honeycomb configuration by extrusion.

When the metal powder mixture is blended into an organic binder and water, prior to the addition of water, an antioxidant, such as oleic acid, may be added to the metal powder mixture. Alternatively, powders of metals which are subjected to anti-oxidation process may be employed.

Next, the formed honeycomb body is fired in a non-oxidizing atmosphere at a temperature ranging between about 1000° and 1400° C. During sintering in a non-oxidizing atmosphere containing hydrogen, the organic binder is decomposed and thereby removed with the aid of Fe or the like which acts as a catalyst, and a good sintered body can therefore be obtained.

Sintering at a temperature lower than 1000° C. achieves no sintering. Sintering conducted at a temperature higher than 1400° C. causes deformation of the resulting sintered body.

Preferably, a heat-resistant metal oxide is then coated on the surface of the cell walls and that of the pores of the obtained sintered body by any of the following methods:

(1) the sintered body is subjected to the heat-treatment in an oxidizing atmosphere at a temperature ranging between 700° to 1100° C.

(2) Al or the like is plated (e.g., vapor plating) on the surface of the cell walls and that of the pores of the sintered body and that sintered body is then subjected to heat-treatment in the oxidizing atmosphere at a temperature between 700° and 1100° C.

(3) the sintered body is dipped into a molten metal, such as Al, and that sintered body is then subjected to the heat-treatment in an oxidizing atmosphere at a temperature between 700° and 1100° C.

(4) alumina sol or the like is coated on the surface of the cell wall and that of the pores of the sintered body and that sintered body is then subjected to heat-treatment in an oxidizing atmosphere at a temperature between 700° and 1100° C.

To enhance resistance to heat and oxidation, heat-treatment conducted at a temperature ranging between 900° and 1100° C. is preferred.

Next, a resistance adjusting means of any form is provided within the obtained metallic honeycomb structure between the electrodes thereof, hereinafter described.

The resistance adjusting means provided on the honeycomb structure may take on any of the following forms:

(1) a slit or slits of any length, formed in any direction at any position.
(2) variations in the length of cell walls in the axial direction of the passages.
(3) variations in the thickness (wall thickness) of the cell walls of the honeycomb structure or variations in the cell density of the honeycomb structure.
(4) a slit or slits formed in the cell wall (rib) of the honeycomb structure.

The honeycomb heater of the present invention is produced by providing electrodes on the outer periphery or inside of the metal honeycomb structure obtained in the manner described above by means of brazing or welding.

The term, "electrodes" is used in this application to refer to any terminal through which a voltage is applied to the honeycomb heater. The electrodes include direct bonding of the outer peripheral portion of the heater to a can body and terminals thereon for grounding.

In the metallic honeycomb structure, the resistance thereof will preferably be held between 0.001 $\Omega$ and 0.5 $\Omega$.

Whereas the honeycomb structure employed in the present invention may have any honeycomb configuration, it is desirable that the cell density ranges from 6 to 1500 cells/in$^2$ (0.9 to 233 cells/cm$^2$) with a wall thickness ranging from 50 to 2000 $\mu$m.

As stated above, the honeycomb structure employed in the present invention may be porous or non-porous. To achieve sufficient mechanical strength and resistance to oxidation and corrosion, however, the porosity of the metal honeycomb structure will preferably be held between 0 and 50% by volume with most preferable porosity being less than 25% by volume.

The term, "honeycomb structure" is employed in this application to refer to an integral body having a large number of passages partitioned by cell walls. The passages may have any cross-sectional form (cell shape), e.g., a circular, polygonal or corrugated form.

The honeycomb heater of the present invention is produced as mentioned above. If it is disposed upstream (in front) of the main monolithic catalyst, the honeycomb heater would be poisoned by Pb and P very much. Therefore, a protective film being porous of $Al_2O_3$, $ZrO_2$ or the like is preferably put in the thickness of 5–20 μm on the catalyst composition carried on the honeycomb heater in order to prevent direct interaction between the poisoning substances and the precious metal; consequently to improve durability.

The present invention is hereinafter described in more detail by way of Examples. However, the present invention is in no way restricted to the following Examples.

EXAMPLES

Preparation of Substrate of Honeycomb Heater (1) Honeycomb Heater I

Fe powder, FE-Al powder (Al: 50% by weight) and Fe-Cr powder (Cr: 50% by weight), having average particle sizes of 10, 20 and 22 μm, were mixed to prepare a mixture having a composition of Fe-22Cr-5Al (% by weight), and the obtained mixture was then blended into an organic binder (methyl cellulose), an antioxidant (oleic acid) and water to produce a readily formable body. That body was formed into a square cell honeycomb structure having a rib thickness of 4 mil and a cell density of 400 cells/in$^2$ (cpi$^2$) by extrusion. The extruded honeycomb structure was dried and fired in $H_2$ atmosphere at 1300° C. Thereafter, the obtained honeycomb structure was subjected to heat-treatment in the atmosphere at 1000° C.

The obtained honeycomb structure had a porosity of 22% by volume.

The electrodes 11 were provided on the outer wall 10 of the thus-obtained honeycomb structure having an outer diameter of 90 mmφ and a length of 25 mm, as shown in FIG. 1. Also, six slits 12 having a length of 70 mm were formed in the honeycomb structure in the axial direction of the passages (the slits provided at the two ends had a length of 50 mm) at intervals of seven cells (about 10 mm). Zirconia type heat-resistant inorganic adhesive was filled in an outer peripheral portion 13 of each slit 12 to form an insulating portion.

(2) Honeycomb Heater II

In the same manner as that of the honeycomb heater I was obtained a honeycomb heater substrate II having a composition of Fe-25Al(% by weight). This substrate II had a porosity of 30% by volume.

(3) Honeycomb Heater III

In the same manner as that of the honeycomb heater I was obtained a honeycomb heater substrate III having a composition of Fe-20 Cr (% by weight). This base III had a porosity of 3% by volume.

Preparation of Catalyst Composition (1) Procedure A

An aqueous solution of rhodium nitrate was impregnated into partially stabilized $ZrO_2$ powder, which contained 3% $Y_2O_3$ by mole, had a specific surface area of 16m$^2$/g and was commercially available (shown in Table 1). Then the resultant powder was dried at 120° C. for 16 hours and calcined at 650° C. for 1 hour. Thus, $ZrO_2$ powder containing Rh was obtained. Next, to 90 parts by weight of commercially available γ-$Al_2O_3$ powder having a BET specific surface area of 200 m$^2$/g was added a mixture of cerium acetate and ceria powder in an amount of 10 parts by weight in terms of ceria. There were further added 150 parts by weight of water and a little amount of acetic acid. The resulting mixture was milled in a pot mill to obtain slurry. The obtained slurry was dried at 120° C. for 16 hours and calcined at 650° C. for 1 hour to obtain alumina powder containing ceria.

Into the obtained alumina powder containing ceria was impregnated aqueous solutions of dinitrodiamine platinum, palladium nitrate and rhodium nitrate, in the amount of Pt, Pd and Rh shown in Table 1. Then, the resultant powder was dried at 120° C. for 16 hours and calcined at 650° C. for 1 hour. Thus, ceria alumina powder containing platinum group element(s) was obtained.

The obtained $ZrO_2$ powder containing Rh and ceria alumina powder containing platinum group elements were wet-milled (acetic acid was added as a defloccuulant) in the weight ratios shown in Table 1 to obtain a slurry for loading. The honeycomb heater base I was loaded with the slurry by plural coatings and then fired at 525° C. for 3 hours to obtain catalysts No. 1–11. The loading amount was made to be 140g/l.

(2) Procedure B

The Rh-containing $ZrO_2$ powder, obtained in the same manner as in Procedure A, was added to commercially available desired γ-$Al_2O_3$ powder having a BET specific surface area of 200 m$^2$/g, a mixture of cerium acetate and ceria powder and acetic acid (as a defloccuulant). The resulting mixture was milled in a pot mill to obtain a slurry for loading. The honeycomb heater base was loaded with this slurry by plural coatings and fired at 525° C. for 3 hours after drying and an aqueous solution of dinitrodiamine platinum was impregnated into the catalyst layer covering the honeycomb heater baset. The resultant catalyst layer loaded with platinum was fired at 525° C. for 3 hours to obtain catalyst No. 12.

(3) Procedure C

The catalyst No. 2 which had been obtained in Procedure A was coated with the $ZrO_2$ powder, which had been used in Procedure A, as a protective film in the thickness of 10 μm to obtain a catalyst No. 13.

Also, in the same manner as in Procedure A except that the honeycomb heater II and III were used, catalysts No. 14 and 15 were obtained.

(4) Procedure D (Comparative Example)

To 90 parts by weight of commercially available γ-$Al_2O_3$ powder having a BET specific surface area of 200 m$^2$/g was added a mixture of cerium acetate and ceria powder in an amount of 10 parts by weight in terms of ceria. There were further added 150 parts by weight of water and a little amount of acetic acid. The resulting mixture was milled in a pot mill to obtain a slurry, with which a honeycomb heater base was coated plural times, and fired at 525° C. for 3 hours. The resultant sintering article was loaded with dinitrodiamine platinum, palladium nitrate and rhodium nitrate by impregnation in the containing amount of Pt, Pd and Rh shown in Table 1. Then catalysts Nos. 16-18 were obtained by firing at 525° C. for 3 hours after drying.

(5) Procedure E (Comparative Example)

A catalyst No. 19 was obtained in the same manner as in Procedure A, except that $ZrO_2$ powder containing Rh was used.

Evaluation of Honeycomb Heaters (1) Durability Test a

There was used a 2,000 cc engine provided with one of the catalysts No. 1 to 19. the engine was operated for 60 seconds at an air-to-fuel (A/F) ratio close to a stoichimetric point, so as to give a gas temperature of 750° C. at the catalyst bed inlet (catalyst bed temperature=-about 800° C.), and then the fuel supply was stopped for 5 seconds to shift to a fuel-lean mixture. This cycle was repeated to subject each catalyst to total 100 hours of aging.

(2) Durability Test b

Catalytic converters were produced by disposing the catalysts no. 2 and 17 (preheaters with a catalyst) which had been obtained in the present invention on the upstream (front) side of commercially available three-way catalysts -namely, main monolithic catalysts (honeycomb structures which had a volume of 1.31; whose carrier was ceramic; which consisted of square cells having a rib thickness of 6 mil and a cell density of 400 cells/in[2]). These catalytic converters were subjected to aging on the same conditions as in Durability test a.

(3) Evaluation of Light-off Performance and Steady State Performance (Three-way Characteristic)

Parts of the honeycomb heater with a catalyst which had been obtained in Durability test a were cut off to evaluate their catalytic performance in a simulated exhaust gas (a mixture gas).

The light-off performance was evaluated as follows: Catalysts were subjected to temperature elevation from 100° C. to 550° C. at a constant rate of 8° C./min on a condition of A/F=14.6; and the temperature at which the conversion of a particular gas component in the exhaust gas became 50% was taken as a light-off temperature T50%(°C.).

The three-way characteristic was evaluated as follows: There were measured conversion efficiency of each gas component in the exhaust gas at a reaction temperature of 400° C. at a ratio of A/F=14.6. This conversion efficiency was taken as a three-way characteristic of the catalysts used.

Incidentally, the space velocity during measurement was always 50,000 hr$^{-1}$. The exhaust gas in the case of A/F=14.6 had a composition (by volume) of 1.7% (CO), 2,760 ppm (HC) (in terms of C), 950 ppm ($NO_x$), 1.3% ($O_2$), 0.6% ($H_2$), 13.2% ($CO_2$), 10.0% ($H_2O$), 23 ppm ($SO_2$) and the remainder ($N_2$).

The results are shown in Table 1.

TABLE 1

| Catalyst No. | Substrate of honeycomb heater | Preparation of catalyst composition | Precious metal (up) Loaded amount (down) | Catalyst composition Rh—$ZrO_2$ (wt %) | Precious metal-$Al_2O_3$.$CeO_2$ (wt %) | Light-off performance T50% (°C.) CO | HC | NO | Three-way characteristic (%) CO | HC | NO |
|---|---|---|---|---|---|---|---|---|---|---|---|
| Example |
| 1 | I | A | Pt/Rh = 5/1<br>0.53 g/l | 15<br>(0.42)*[1] | 85 | 290 | 290 | 300 | 90.6 | 89.9 | 90.3 |
| 2 | I | A | Pt/RH = 5/1<br>1.06 g/l | 15<br>(0.84)*[1] | 85 | 280 | 300 | 295 | 95.4 | 93.2 | 93.3 |
| 3 | I | A | Pt/Rh = 5/1<br>1.59 g/l | 15<br>(1.26)*[1] | 85 | 270 | 280 | 280 | 97.2 | 96.8 | 95.1 |
| 4 | I | A | Pt/Rh = 19/1<br>1.06 g/l | 15<br>(0.25)*[1] | 85 | 320 | 325 | 310 | 86.8 | 84.7 | 80.8 |
| 5 | I | A | Pt/Rh = 10/1<br>1.06 g/l | 15<br>(0.46)*[1] | 85 | 275 | 295 | 290 | 94.8 | 94.1 | 92.4 |
| 6 | I | A | Pd/Rh = 5/1<br>1.06 g/l | 15<br>(0.84)*[1] | 85 | 260 | 270 | 290 | 96.7 | 96.1 | 94.8 |
| 7 | I | A | Pt/Pd/Rh = 2.5/2.5/1<br>1.06 g/l | 15<br>(0.84)*[1] | .85 | 255 | 265 | 280 | 98.4 | 97.3 | 95.4 |
| 8 | I | A | Pt/Rh = 5/1<br>1.06 g/l | 5<br>(2.5)*[1] | 95 | 285 | 300 | 285 | 93.7 | 95.1 | 92.7 |
| 9 | I | A | Pt/Rh = 5/1<br>1.06 g/l | 50<br>(0.25)*[1] | 50 | 290 | 300 | 285 | 94.8 | 93.8 | 92.4 |
| 10 | I | A | Pt/Rh = 5/1<br>1.06 g/l | 15<br>(0.46)*[1] | 85 | 285 | 305 | 305 | 93.7 | 92.9 | 92.7 |
| 11 | I | A | Pt/Rh = 5/1<br>1.06 = g/l | 15<br>(0.84 + 0.84 Pt)*[1] | 85 | 280 | 300 | 305 | 95.1 | 93.0 | 91.8 |
| 12 | I | B | Pt/Rh = 5/1<br>1.06 g/l | 15<br>(0.84)*[1] | 85 | 290 | 310 | 300 | 94.2 | 92.8 | 90.5 |
| 13 | I | C ($ZrO_2$ protection film) | Pt/Rh = 5/1<br>1.06 g/l | 15<br>(0.84)*[1] | 85 | 290 | 305 | 300 | 99.2 | 97.9 | 98.2 |
| 14 | II | A | Pt/Rh = 5/1<br>1.06 g/l | 15<br>(0.84)*[1] | 85 | 275 | 285 | 285 | 96.4 | 95.2 | 93.3 |
| 15 | III | A | Pt/Rh = 5/1<br>1.06 g/l | 15<br>(0.84)*[1] | 85 | 310 | 320 | 310 | 89.1 | 88.2 | 82.4 |
| Comparative Example |
| 16 | I | D | Pt/Rh = 19/1<br>1.06 g/l | — | 100 | 340 | 370 | 380 | 76.8 | 77.2 | 63.8 |
| 17 | I | D | Pt/Rh = 10/1<br>1.06 g/l | — | 100 | 330 | 350 | 360 | 80.7 | 80.5 | 72.1 |

TABLE 1-continued

| Catalyst No. | Substrate of honeycomb heater | Preparation of catalyst composition | Precious metal (up) Loaded amount (down) | Catalyst composition Rh—ZrO$_2$ (wt %) | Precious metal-AL$_2$O$_3$.CeO$_2$ (wt %) | Light-off performance T50% (°C.) CO | HC | NO | Three-way characteristic (%) CO | HC | NO |
|---|---|---|---|---|---|---|---|---|---|---|---|
| 18 | I | D | Pt/Rh = 5/1 1.06 g/l | — | 100 | 320 | 330 | 310 | 85.4 | 83.2 | 80.8 |
| 19 | I | E | Pt/Rh = 5/1 1.06 g/l | — | 100 | 315 | 325 | 310 | 87.8 | 84.3 | 81.3 |

(NOTE) *$^1$Proportion of Rh to ZrO$_2$

(4) Evaluation of Heating Performance

The catalytic converters which had been obtained Durability test b were used to evaluate the catalytic performance for exhaust gas at the beginning of operation of the engine.

An automobile whose engine displacement was 2400 cc was given Bag test of FTP. Supply of a current to the heater was made immediately after the engine on Bag I test began to operate. The voltage supplied to the heater was 24V; the supply of a current began after engine had started; the supplying was continued for 60 seconds. While the heater was supplied with a current, the temperature of gas in the center of the heater was adjusted to 400° C. The secondary air was taken into the catalytic converter at a rate of 200 l/min for 40 seconds from the engine starting.

The results are shown in Table 2.

In order to make a comparison, the purification ability of the catalytic converters which had not been subjected to Durability test b, that is fresh catalysts were also evaluated.

TABLE 2

| Catalyst No. | | FTP Total emission (g/mile) HC | CO | NO |
|---|---|---|---|---|
| Example | | | | |
| 2 | Fresh Converter | 0.03 | 0.20 | 0.18 |
| | Converter obtained by durability test | 0.05 | 0.57 | 0.24 |
| Comparative Example | | | | |
| 17 | Fresh Converter | 0.04 | 0.25 | 0.23 |
| | Converter obtained by durability test | 0.09 | 0.87 | 0.49 |

As shown in Table 1, every sample of the present invention was excellent in light-off performance and three-way characteristic, even after a durability test. In particular, the catalytic performance of NO$_x$ was high because of interaction between Rh and ZrO$_2$. The catalysts No. 1 and 4 which contained less Rh showed excellent performance as much as or more than the catalyst No. 18 which contained more Rh. Therefore, drastic cut of expenses can be made by reducing precious metal.

In the cases of the catalysts No. 14 and 15 (the compositions were Fe-22Al and Fe-20 Cr, respectively), the catalyst No. 14 had a sufficient catalytic performance after a durability test, though, several cracks occurred in the cells owing to vibration and thermal shock during the durability test; the durability of the catalyst No. 15 was not sufficiently high. Consequently, it is preferable that a honeycomb heater base adequately composed be used. In the catalyst layer of the catalyst No. 15, separating of Fe and Cr was observed.

Making a comparison between the catalysts No. 2 and 17 whose compositions and loading amount of precious metal were the same, the ETP emission of each catalytic converter was evaluated when the heater was supplied a current: In the beginning, the difference of their performance was small; however, after the durability test, the heater of the present invention proved to be excellent.

As will be understood from the foregoing description, the honeycomb heaters and catalytic converters of the present invention have excellence in purification of gas such as light-off performance at low temperature and three-way catalytic performance, heat resistance and durability against poisonous substances.

When a honeycomb heater of the present invention which has a specific composition is employed, a honeycomb heater and catalytic converter are obtained which have rapid-heating abilities, excellent resistance against heat, shock and so on.

What is claimed is:

1. A honeycomb heater comprising:
   a honeycomb structure having a number of passages defined by partition walls;
   at least two electrodes in electrical contact with said honeycomb structure for energizing said honeycomb structure;
   a catalyst composition being formed on said partition walls of said honeycomb structure, said catalyst composition comprising ZrO$_2$ powder having ZrO$_2$ particle loaded with a catalytically active metal consisting essentially of Rh, and a composite oxide of Al$_2$O$_3$ and CeO$_2$, said composite oxide being loaded with at least one material selected from the group consisting of Pt and Pd.

2. The honeycomb heater of claim 1, wherein Rh is present in the amount of 0.01–15.0% by weight with respect to said ZrO$_2$ powder.

3. The honeycomb heater of claim 1, wherein said ZrO$_2$ powder is present in an amount of 5–50% by weight with respect to said catalyst composition.

4. The honeycomb heater of claim 1, wherein the composite oxide is loaded with Pt and a total loading amount of Pt ranges from 0.5 to 1.6 grams per liter of the honeycomb heater, and a total loading amount of Rh ranges from 0.02 to 0.3 grams per liter of the honeycomb heater.

5. The honeycomb heater of claim 1, wherein the composite oxide is loaded with Pt and a weight ratio of Rh to Pt ranges from 1/19 to 1/5.

6. The honeycomb heater of claim 1, wherein said honeycomb structure comprises 2–30% by weight of Al, 10–40% by weight of Cr, and the remainder being substantially Fe.

7. The honeycomb heater of claim 1, wherein a resistance adjusting means is disposed between said electrodes and within said honeycomb structure.

8. The honeycomb heater of claim 1, further comprising a porous layer of a heat-resistant oxide coated on said catalyst composition.

9. A catalytic converter for a fluid to be flowed therethrough, comprising:
one main monolithic catalyst for disposal in a fluid stream;
a honeycomb heater for disposal in said fluid stream in a location selected from the group consisting of upstream and downstream of said main monolithic catalyst, said honeycomb heater comprising a honeycomb structure having a number of passages defined by partition walls, at least two electrodes in electrical contact with said honeycomb structure for energizing said honeycomb structure, a catalyst composition formed on said partition walls of said honeycomb structure, said catalyst composition comprising $ZrO_2$ powder having $ZrO_2$ particles loaded with a catalytically active metal consisting essentially of Rh, and a composite oxide of $Al_2O_3$ and $CeO_2$, said composite oxide being located with at least one material selected from the group consisting of Pt and Pd; and a housing containing said main monolithic catalyst and said honeycomb heater.

10. A catalytic converter for a fluid to be flowed therethrough, comprising:
at least two main monolithic catalyst for disposal in a fluid stream;
a honeycomb heater for disposal in said fluid stream in a location selected from the group consisting of downstream of said at least two main monolithic catalyst, upstream of said at least two main monolithic catalysts and between two of said at least two main monolithic catalysts, said honeycomb heater comprising a honeycomb structure having a number of passages defined by partition walls, at least two electrodes in electrical contact with said honeycomb structure for energizing said honeycomb structure, a catalyst composition formed on said partition walls of said honeycomb structure, said catalyst composition comprising $ZrO_2$ powder having $ZrO_2$ particles loaded with a catalytically active metal consisting essentially of Rh, and a composite oxide of $Al_2O_3$ and $CeO_2$, said composite oxide being loaded with at least one material selected from the group consisting of Pt and Pd; and a housing containing said at least two main monolithic catalysts and said honeycomb heater.

* * * * *

UNITED STATES PATENT AND TRADEMARK OFFICE
CERTIFICATE OF CORRECTION

PATENT NO. : 5,318,757
DATED : June 7, 1994
INVENTOR(S) : Abe et al.

It is certified that error appears in the above-indentified patent and that said Letters Patent is hereby corrected as shown below:

On the title page: Item [75], change "Susuki" to --Suzuki--.

Signed and Sealed this

Sixth Day of September, 1994

Attest:

BRUCE LEHMAN

Attesting Officer

Commissioner of Patents and Trademarks